US007177118B2

United States Patent
Do et al.

(10) Patent No.: US 7,177,118 B2
(45) Date of Patent: Feb. 13, 2007

(54) MAGNETIC RECORDING SYSTEM WITH THREE-LAYER LAMINATED MEDIA HAVING IMPROVED SIGNAL-TO-NOISE RATIO

(75) Inventors: Hoa Van Do, Fremont, CA (US); David Margulies, Los Gatos, CA (US); Hal J. Rosen, Los Gatos, CA (US); Natacha F. Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 438 days.

(21) Appl. No.: 10/853,631

(22) Filed: May 24, 2004

(65) Prior Publication Data

US 2005/0259351 A1  Nov. 24, 2005

(51) Int. Cl.
*G11B 5/012* (2006.01)
*G11B 5/62* (2006.01)
(52) U.S. Cl. .................................. 360/135; 360/234.3
(58) Field of Classification Search ................ 360/135; 428/828.1
See application file for complete search history.

(56) References Cited

U.S. PATENT DOCUMENTS

| 5,051,288 | A | 9/1991 | Ahlert et al. | |
|---|---|---|---|---|
| 6,583,958 | B1 * | 6/2003 | Suzuki et al. | 360/135 |
| 6,689,495 | B1 * | 2/2004 | Sato et al. | 428/831 |
| 6,759,138 | B2 * | 7/2004 | Tomiyasu et al. | 428/828.1 |
| 6,794,057 | B2 * | 9/2004 | Wang et al. | 428/828.1 |
| 6,821,653 | B2 * | 11/2004 | Fukushima et al. | 428/831.2 |
| 6,989,952 | B2 * | 1/2006 | Margulies et al. | 360/59 |
| 7,081,309 | B2 * | 7/2006 | Do et al. | 428/828.1 |
| 2002/0098390 | A1 | 7/2002 | Van Do et al. | |
| 2003/0169542 | A1 * | 9/2003 | Gill | 360/324.2 |
| 2004/0013910 | A1 | 1/2004 | Archarya et al. | |
| 2005/0259351 | A1 * | 11/2005 | Do et al. | 360/97.01 |

FOREIGN PATENT DOCUMENTS

| EP | 0654783 A1 | 5/1995 |
|---|---|---|
| JP | 05128469 | 5/1993 |

OTHER PUBLICATIONS

EPO Search Report, Entire Document.

* cited by examiner

*Primary Examiner*—Jefferson Evans
(74) *Attorney, Agent, or Firm*—Thomas R. Berthold

(57) ABSTRACT

A magnetic recording system uses a magnetic recording medium having a laminated magnetic structure with at least three magnetic layers, wherein the magnetic layers have decreasing intrinsic coercivity $H_0$ with distance from the write head. The write field at the center of each magnetic layer is greater than that layer's $H_0$. The magnetic layers have different compositions and/or thicknesses and thereby different values of $H_0$. The alloys used in the middle and upper magnetic layers are relatively "high-moment" alloys that would not ordinarily be used in magnetic recording media because they have relatively low $S_0NR$, but the overall $S_0NR$ of the laminated magnetic structure is improved because of the effect of lamination. The middle and upper magnetic layers can be made substantially thinner, which enables the magnetic layers to be located closer to the write head, thereby exposing each of the magnetic layers to a higher write field.

26 Claims, 5 Drawing Sheets

MAGNETIC RECORDING SYSTEM WITH THREE-LAYER LAMINATED MEDIA HAVING IMPROVED SIGNAL-TO-NOISE RATIO

RELATED APPLICATION

This application is related to concurrently filed application Ser. No. 10/853,431 titled LAMINATED MAGNETIC RECORDING MEDIUM HAVING IMPROVED SIGNAL-TO-NOISE RATIO. Both applications are based on a common specification, with this application having claims directed to a magnetic recording system and application Ser. No. 10/853,431 having claim directed to a magnetic recording medium.

BACKGROUND OF THE INVENTION

1. Field of the Invention

This invention relates generally to magnetic recording disk drives, and more particularly to a magnetic recording disk drive that uses a "laminated media" magnetic recording disk with improved intrinsic media signal-to-noise ratio ($S_0NR$).

2. Description of the Related Art

In magnetic recording disk drives, where the magnetic recording media on the disks is a granular metal alloy, such as a CoPt alloy, the intrinsic media noise increases with increasing linear recording density. Media noise arises from irregularities in the recorded magnetic transitions and results in random shifts of the readback signal peaks. High media noise leads to high bit error rates. Thus to obtain higher areal densities in magnetic recording disk drives, it is necessary to decrease the intrinsic media noise, i.e., increase the signal-to-noise ratio ($S_0NR$), of the recording media.

The media $S_0NR$ is to first order proportional to 20 log ($N^{1/2}$), where N is the number of magnetic grains per unit area in the media and $S_0NR$ is expressed in units of dB. Accordingly, increases in $S_0NR$ can be accomplished by increasing N. However, N is limited by the individual grain area (A) required to maintain the thermal stability of the recorded magnetization. This limitation arises because the energy term protecting against thermal degradation is $K_UV$, where $K_U$ is the anisotropy and V is the volume of an individual magnetic grain. $K_UV$ must be kept greater than a certain value to assure thermal stability of the recorded magnetizations. Increasing N by merely reducing the grain area A will reduce V since V=At, where t is the grain height (i.e., the thickness of the magnetic recording layer), and this will reduce $K_UV$, leading to thermal instability. One approach to prevent this problem is to proportionally increase the anisotropy $K_U$ as V is decreased. However, this approach is limited by the available magnetic write field produced by the recording head. The magnetic field necessary to write the media (i.e., change the recorded magnetizations) is represented by the short-time or intrinsic coercivity $H_0$ of the media, which is proportional to $K_U/M$, where M is the grain magnetization or magnetic moment. Therefore, increasing $K_U$ will increase $H_0$ and may prevent the media from being able to be written by a conventional recording head. Thus, to ensure reliable operation of a magnetic recording disk drive, the media must have sufficiently high $S_0NR$, sufficiently low $H_0$ to be writable, and sufficiently high $K_UV$ to be thermally stable.

Improved media $S_0NR$ can be achieved with "laminated" media. In laminated media, the single magnetic layer is replaced with a laminate of two or more separate magnetic layers that are spaced apart and magnetically decoupled by nonmagnetic spacer layers. This discovery was made by S. E. Lambert, et al., "Reduction of Media Noise in Thin Film Metal Media by Lamination", IEEE Transactions on Magnetics, Vol. 26, No. 5, September 1990, pp. 2706–2709, and patented in U.S. Pat. No. 5,051,288. Published patent application US2002/0098390 describes a laminated media of two or more magnetic layers wherein the lower magnetic layer is an antiferromagnetically-coupled (AFC) layer. Laminated media increases $S_0NR$ because N is increased, e.g., essentially doubled when two magnetic layers are used or tripled when three magnetic layers are used. In laminated media the same magnetic alloy composition that was used in the single magnetic layer is used in all magnetic layers, so that it is not necessary to use a higher $K_U$ magnetic alloy material. Thus $K_U$ remains the same as for the single-layer media. If each magnetic layer in the laminate is also the same thickness as the single magnetic layer, then the grain volume V remains the same because the grains in the two magnetic layers are magnetically decoupled by the nonmagnetic spacer layer. Thus $S_0NR$ is increased without a reduction in $K_UV$ so that thermal stability is not decreased.

However, the laminated media approach to increasing media $S_0NR$ requires substantially thicker media, e.g., a doubling of the total magnetic layer thickness if two magnetic layers are used. An increase in the total thickness causes a different problem, namely difficulty in writing. This is because the write field from the recording head decreases with distance from the write head and thus the strength of the write field is less at the bottom magnetic layer than at the top magnetic layer. If $H_0$ of the bottom magnetic layer in the laminated media is greater than the write field, the magnetization of the bottom magnetic layer cannot be switched and thus data cannot written to the laminated media. Thus it has not been possible to fabricate useful laminated media with more than two magnetic layers.

What is needed is laminated media with more than two magnetic layers and with good magnetic recording properties.

SUMMARY OF THE INVENTION

The invention is a magnetic recording system with a magnetic recording medium having a laminated magnetic structure with at least three magnetic layers, wherein the magnetic layers have decreasing intrinsic coercivity $H_0$ with distance from the write head. The lower magnetic layer in the laminated structure is the top ferromagnetic film of an antiferromagnetically-coupled (AFC) layer, and the middle and upper layers in the laminated structure are individual magnetic layers. The write field at the center of each magnetic layer is greater than that layer's $H_0$, enabling the magnetization of each magnetic layer to be switched by the write field. The magnetic layers have different compositions and/or thicknesses and thereby different values of $H_0$. If the alloy used in the magnetic layers is a CoPtCrB alloy, the intrinsic coercivity is varied primarily be varying the amount of Pt and/or Cr. The alloys used in the middle and upper magnetic layers are relatively "high-moment" alloys that would not ordinarily be used in magnetic recording media because they have relatively low $S_0NR$. The middle and upper magnetic layers can be made substantially thinner, which enables the magnetic layers to be located closer to the write head, thereby exposing each of the magnetic layers to a higher write field. Even though the middle and upper magnetic layers have relatively low $S_0NR$, the overall $S_0NR$ of the laminated magnetic structure is improved because of the effect of lamination.

For a fuller understanding of the nature and advantages of the present invention, reference should be made to the following detailed description taken together with the accompanying figures.

DETAILED DESCRIPTION OF THE INVENTION

Prior Art

Figure 1:
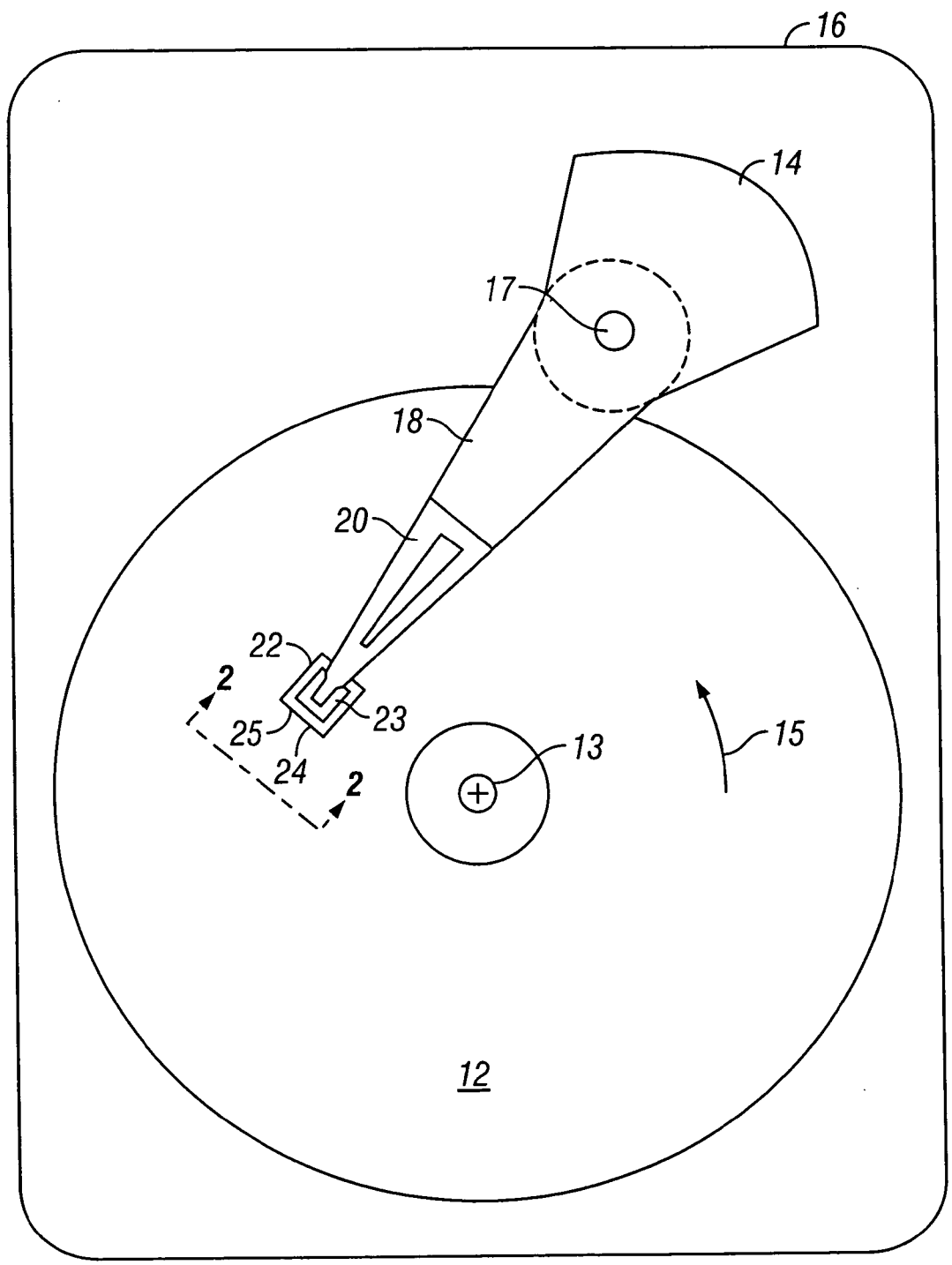
FIG. 1 is a schematic top view of a conventional magnetic recording hard disk drive with the cover removed.

FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
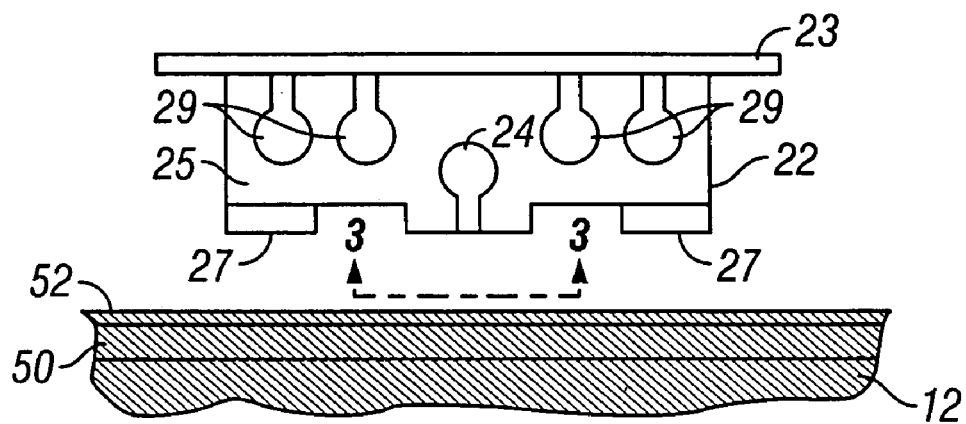
FIG. 2 is an enlarged end view of the slider and a section of the disk taken in the direction 2—2 in FIG. 1.

FIG. 2 is an enlarged end view of the slider 22 and a section of the disk 12 taken in the direction 2—2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 22 in very close proximity to or in near-contact with the surface of disk 12. The read/write head 24 is formed on the trailing surface 25 and is connected to the disk drive read/write electronics by electrical connection to terminal pads 29 on the trailing surface 25. The disk 12 is shown in section to illustrate the magnetic recording layer 50 and protective overcoat 52.

Figure 3:
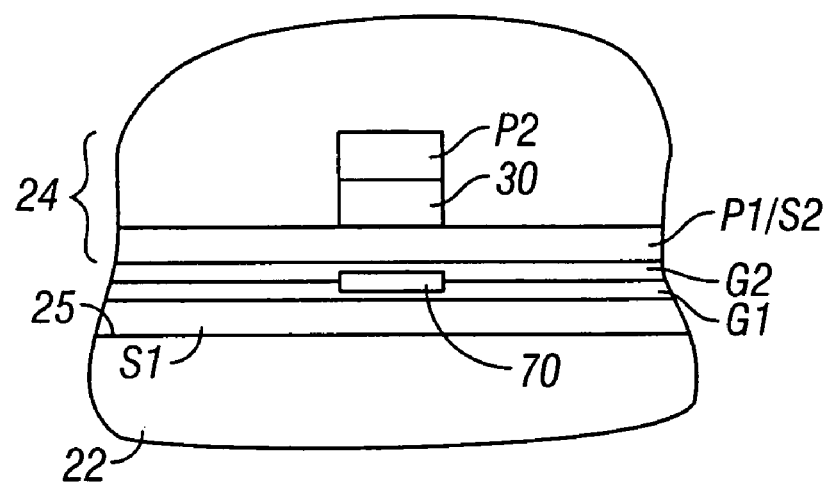
FIG. 3 is a view in the direction 3—3 of FIG. 2 and shows the ends of the read/write head as viewed from the disk.

FIG. 3 is a view in the direction 3—3 of FIG. 2 and shows the ends of read/write head 24 as viewed from the disk 12. The read/write head 24 is a series of thin films deposited and lithographically patterned on the trailing surface 25 of slider 22. The write head includes magnetic write poles P1/S2 and P2 separated by a write gap 30. The magnetoresistive sensor or read head 70 is located between two insulating gap layers G1, G2 that are typically formed of alumina. Gap layers G1, G2 are located between magnetic shields S1 and P1/S2, with P1/S2 also serving as the first write pole for the write head 24.

Figure 4:
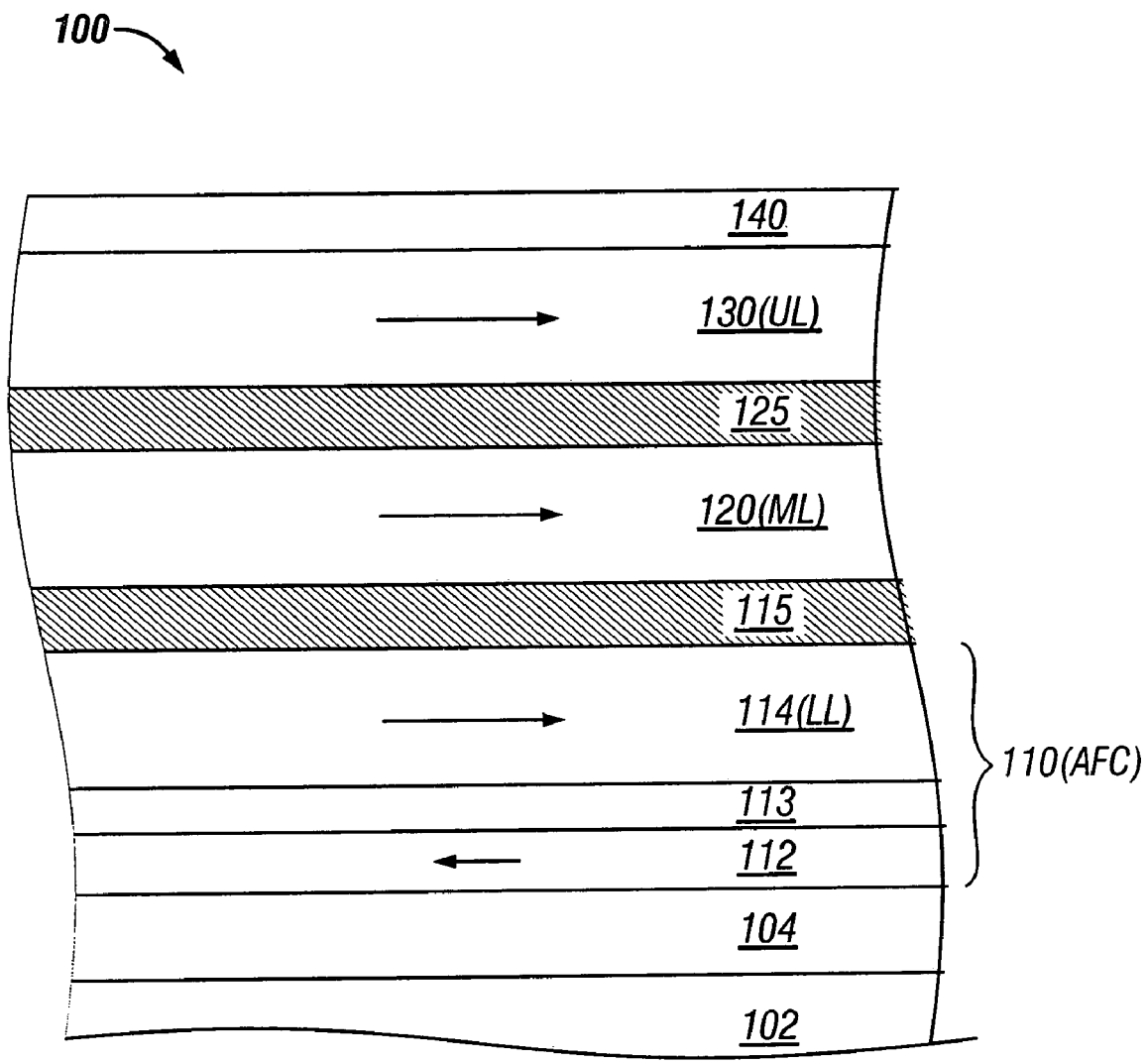
FIG. 4 is a cross-sectional view of a proposed prior art magnetic recording disk with a laminated magnetic structure.

FIG. 4 is a cross sectional view of a proposed prior art magnetic recording disk 100 having a laminated magnetic structure formed of three magnetic layers with the top layer 114 of an antiferromagnetically-coupled (AFC) layer 110 being the lower layer (LL), middle ferromagnetic layer (ML) 120 and upper ferromagnetic layer (UL) 130, all formed on disk substrate 102. The disk 100 also includes an underlayer structure 104 of one or more seed layers or underlayers, nonferromagnetic spacer layers 115 and 125, and a conventional protective overcoat 140.

The AFC layer 110 is made up of two ferromagnetic layers or films (bottom film 112 and top film 114) that are antiferromagnetically coupled by antiferromagnetically-coupling film 113, such that the net $Mrt_{LL}$ of AFC layer 110 is given by $Mrt_{114} - Mrt_{112}$. The antiferromagnetically-coupling film 113 has a thickness and composition to provide antiferromagnetic exchange coupling of films 112, 114, as is well-known in the art, and is typically formed of a material selected from the group consisting of ruthenium (Ru), chromium (Cr), rhodium (Rh), iridium (Ir), copper (Cu), and their alloys.

The composite Mrt of the laminated structure is: $Mrt_{UL} + Mrt_{ML} + |(Mrt_{114} - Mrt_{112})|$. The disk 100 has a structure like the following:

$Cr_{50}Ti_{50}/Ru_{50}Al_{50}/Cr_{90}Ti_{10}/$
Layer 112=$Co_{89}Cr_{11}$($Mrt_{112}$=0.13 memu/cm$^2$)/Ru(0.6 nm)/
Layer 114=$Co_{63}Pt_{12}Cr_{14}B_{11}$($Mrt_{114}$=0.37 memu/cm$^2$)/Ru (1.2 nm)/
ML=$Co_{63}Pt_{12}Cr_{14}B_{11}$($Mrt_{ML}$=0.37 memu/cm$^2$)/Ru(1.2 nm)/
UL=$Co_{63}Pt_{12}Cr_{14}B_{11}$($Mrt_{UL}$=0.37 memu/cm$^2$)Carbon overcoat.

The $Cr_{50}Ti_{50}/Ru_{50}Al_{50}/Cr_{90}Ti_{10}$ is the underlayer structure 104. LL and ML are magnetically decoupled by the 1.2 nm Ru nonferromagnetic spacer layer 115, and ML and UL are magnetically decoupled by the 1.2 nm Ru nonferromagnetic spacer layer 125. The layers 114, 120 and 130 have the same composition and thickness, i.e., a $Co_{63}Pt_{12}Cr_{14}B_{11}$, alloy, as suggested in the previously cited published patent application US2002/0098390. This composition is considered to be an alloy with a moderately high intrinsic coercivity ($H_0$~8 kOe).

The magnetic moments of the ferromagnetic layers in FIG. 4 are represented by the arrows. The moments of layers 130, 120 and the net magnetic moment of the AFC layer 110 are oriented parallel in the remanent magnetic states after being saturated in an applied magnetic field. Because $Mrt_{114}$ is depicted as being greater than $Mrt_{112}$ (as shown be the relative length of the arrows in these layers), the moment of layer 110 is parallel to the moment of layer 114.

Figure 5:
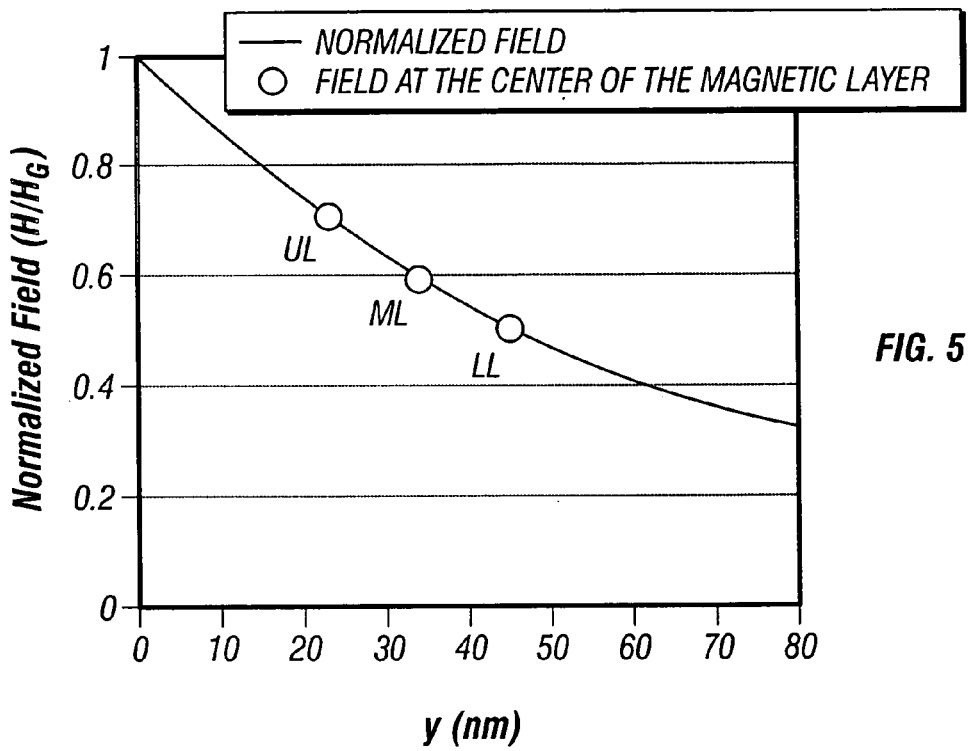
FIG. 5 is a profile of the normalized magnetic field from the write head as a function of vertical spacing from the head for a proposed prior art laminated magnetic disk with identical magnetic layers showing the field at the center of the lower layer being 0.50 of the write gap field.

FIG. 5 shows the typical profile of a normalized magnetic field ($H/H_G$, where $H_G$ is the field at the write gap of the write head) as a function of vertical spacing y from the head pole tips for a recording head with a 100 nm write gap. The field at the center of the magnetic layer is typically used as a measurement of the field available to write that layer. The center of each layer in the proposed three-magnetic-layer laminated structure like that of FIG. 4 is marked on the field profile and assumes each of the three CoPtCrB alloy magnetic layers is 10 nm thick, each of the two nonmagnetic spacer layers is 1 nm thick, and the spacing from the head to the top of UL is 18 nm. From FIG. 5 it can be seen that the fields in the center of the magnetic layers UL, ML and LL are 70%, 59% and 50%, respectively, of the field produced in the write gap ($H_G$). In view of the significant reduction in write field available for LL relative to ML, it is unlikely that a three-magnetic-layer structure like that proposed in the prior art can be written.

Because UL, ML and LL (layer 114) are identical in composition and thickness, each of these layers in the prior art would have the same intrinsic coercivity. (When LL is the top ferromagnetic layer 114 in the AFC layer 110 the head only needs to write this layer because the antiferromagnetic exchange field causes the magnetization of the lower layer 112 to be switched. Thus, the composition of layer 112 has a negligible effect on $H_0$ of LL.) If the composition of the layers was selected so that the intrinsic coercivity is close to 0.70 $H_G$ then the write head would be able to write UL but not LL. If the composition of the layers was selected so that the intrinsic coercivity is close to 0.50 $H_G$ then the write head would be able to write all of the layers but the laminated structure would be unacceptable as a recording medium because the top layer and middle layer would give poor performance and the improvement in $S_0NR$ over a single layer with the intrinsic coercivity close to 0.70 $H_G$ would be slight.

The Invention

Figure 6:
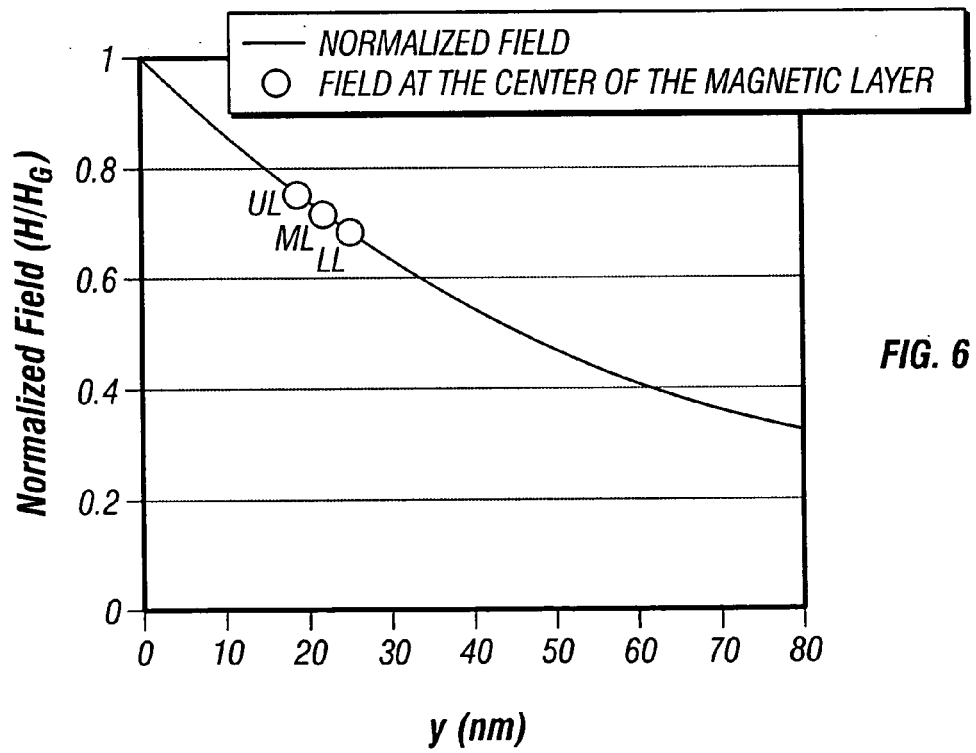
FIG. 6 is a profile of the normalized magnetic field from the write head as a function of vertical spacing from the head for a laminated magnetic disk with identical magnetic layers, but substantially thinner than the layers in FIG. 5, showing the field at the center of the lower layer being 0.68 of the write gap field.

One solution to the problem of not being able to write LL is to make the layers thinner. For example, if each of the three CoPtCrB alloy magnetic layers is the same alloy composition and is 2 nm thick, and each of the two non-magnetic spacer layers is 1 nm thick, then from FIG. 6 it can be seen that the fields in the center of the magnetic layers UL, ML and LL (layer 214) are 75%, 72% and 68%, respectively, of the field produced in the write gap ($H_G$). In this case, the CoPtCrB alloy could have a composition to provide an intrinsic coercivity close to 0.68 $H_G$ and be able to be written by the head. However, this solution results in unacceptably low values of $K_UV$ for each of the layers, such that the layers are thermally unstable and therefore unacceptable for use in a recording medium.

Figure 7:
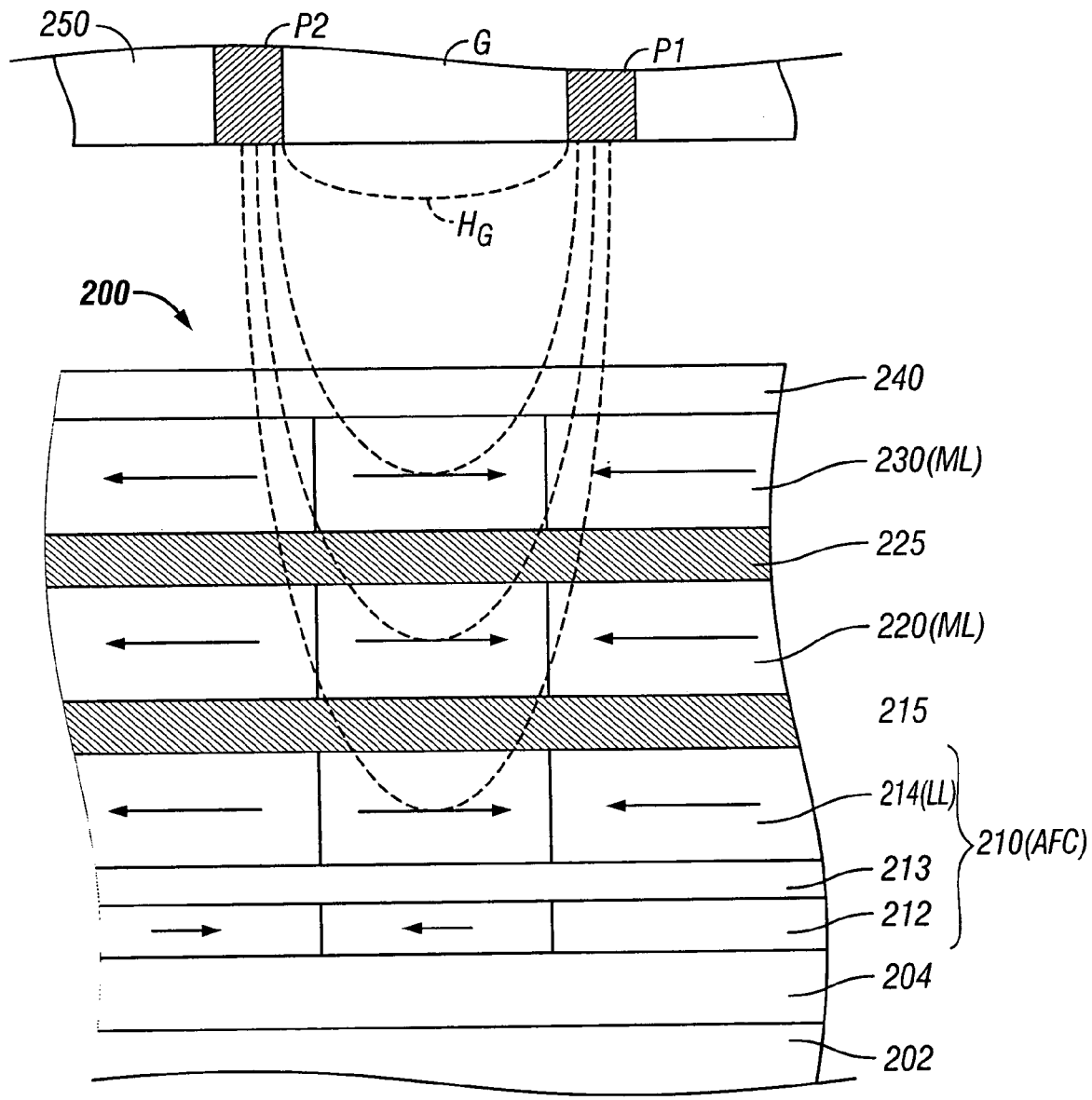
FIG. 7 is a cross-sectional view of the head and disk according to the present invention.

In this invention each of LL, ML and UL have different compositions and/or thicknesses so that the intrinsic coercivity of the magnetic layers decreases with distance from the write head. FIG. 7 illustrates the invention.

FIG. 7 is a cross-sectional view of the magnetic recording disk 200 having a substrate 202 with a laminated magnetic structure formed of three magnetic layers: LL is the top layer 214 of an antiferromagnetically-coupled (AFC) layer 210; ML is the middle ferromagnetic layer 220; and UL is the upper ferromagnetic layer 230. The disk 200 also includes an underlayer structure 204 of one or more seed layers or underlayers, nonferromagnetic spacer layers 215 and 225, and a conventional protective overcoat 240. The AFC layer 210 is made up of bottom ferromagnetic layer 212 and top ferromagnetic layer 214 that are antiferromagnetically coupled by antiferromagnetically-coupling film 213. A write head 250 is maintained above disk 200 and includes write poles P1 and P2 spaced apart by a write gap G. The write head is a conventional thin film head fabricated on the trailing surface of an air-bearing slider, as is well known in the disk drive technology. The write head produces a field $H_G$ at the gap G. The magnetic field lines are represented by the dashed lines in FIG. 7, with the strength of the write field decreasing with distance from the tips of poles P1, P2. The arrows represent the magnetization directions in the respective layers, with the vertical lines in UL, ML and LL representing transitions between the magnetized regions in these layers.

In the disk 200, ML is formed of an alloy with a lower intrinsic coercivity than the alloy in layer UL, which enables ML to be able to be written by the recording head but without a reduction in $Mrt_{UL}$. Similarly, LL (layer 214) can be made of an alloy with a lower intrinsic coercivity than the alloy in layer ML, which enables LL to be able to be written by the recording head but without a reduction in $Mrt_{ML}$. If the alloys used in layer LL, ML and UL are CoPtCrB alloys, then the intrinsic coercivity is reduced primarily by decreasing the amount of Pt. Also, the UL and ML are relatively "high-moment" alloys which allows the layers to be thinner for a given $Mrt_{UL}$ and $Mrt_{ML}$. The moment is increased primarily by decreasing the amount of Cr. Thus, ML and UL will typically have a lower concentration of Cr than LL.

A suitable laminated structure according to the invention would have magnetic layers with the following compositions:

UL: $Co_{63}Pt_{(13-15)}Cr_{(10-16)}B_{(8-15)}$
ML: $Co_{63}Pt_{(12-13)}Cr_{(10-16)}B_{(8-15)}$
LL (layer 214): $Co_{63}Pt_{(11-12)}Cr_{(10-22)}B_{(<7)}$ The above compositions for UL and ML are generally unsuitable for conventional magnetic recording because they are generally considered to be high-moment alloys with significant intergranular exchange coupling causing unacceptably low $S_0NR$. Also, the ML and LL alloys are alloys with relatively low intrinsic coercivity which also causes unacceptably low $S_0NR$. Conventional high performance media are "low-moment" alloys with high intrinsic coercivity, with the Pt amount being 14 at. % or less and with relatively high concentrations of Cr (>approximately 18 at. %) and/or B (>approximately 10 at. %). It is necessary to add segregants such as Cr and B to the CoPt alloy so that the grains are magnetically decoupled to achieve good $S_0NR$. The more these segregants are added the more the grains are decoupled, but the lower the moment of the alloy. Also, the high intrinsic coercivity maximizes the $S_0NR$. In this invention, the alloys in ML and UL are high-moment alloys with relatively poor $S_0NR$.

This invention solves the problem of not being able to write LL in the laminated structure, without reducing the $S_0NR$. By adjusting the $H_0$ values of the layers, then for a given composite Mrt, the magnetic layers can now be written by the head. This significantly changes the ability of the write head to write LL because the intrinsic coercivity of LL is equal to or less than the field produced by the write head at the center of LL. These high-moment alloys with low intrinsic coercivity would not ordinarily be selected because they exhibit reductions in $S_0NR$. However, in this invention, if on their own the individual high-moment layers are 0.5 dB lower than the conventional alloys, then the advantage obtained by being able to write the three-magnetic-layer structure (+1.8 dB) leads to a significant overall improvement in $S_0NR$.

In the preferred embodiment the intrinsic coercivity $H_{0LL}$ of LL is at least 25 percent less than the intrinsic coercivity $H_{0UL}$ of UL, the intrinsic coercivity $H_{0ML}$ of ML is at least 15 percent less than the intrinsic coercivity $H_{0UL}$ of UL, and the intrinsic coercivity $H_{0UL}$ of UL is at least 70 percent of $H_G$. In one example, if a write head with $H_G=15$ kOe is used, then the three-magnetic-layer laminated structure would have UL formed of high-moment $Co_{62}Pt_{15}Cr_{12}B_{11}$ 10 nm thick, ML formed of high-moment $Co_{64}Pt_{13}Cr_{12}B_{11}$ 10 nm thick, layer 214 in LL formed of low-moment $Co_{63}Pt_{12}Cr_{18}B_7$ 10 nm thick, and the spacer layers formed of 1 nm thick Ru. This would result in intrinsic coercivities of about $H_{0UL}=10$ kOe, $H_{0ML}=8$ kOe and $H_{0LL}=7$ kOe, and write fields at the centers of UL, ML and LL of about 10.5 kOe, 8.8 kOe and 7.5 kOe, respectively.

As used herein UL and LL refer to the uppermost and lowermost magnetic layers, respectively, in the laminated structure. If the invention is practiced in a laminated structure with more than three magnetic layers, then such a structure would have more than one middle magnetic layer (ML).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording system comprising:
   a magnetic recording medium comprising a lower ferromagnetic layer (LL) having an intrinsic coercivity $H_{OLL}$, a middle ferromagnetic layer (ML) having an intrinsic coercivity $H_{OML}$ greater than $H_{OLL}$, an upper ferromagnetic layer (UL) having an intrinsic coercivity $H_{OUL}$ greater than $H_{OML}$ wherein $H_{OLL}$ is at least 25 percent less than $H_{OUL}$, a first nonferromagnetic spacer layer between LL and ML, and a second nonferromagnetic spacer layer between ML and UL; and
   an inductive write head having write poles separated by a write gap and capable of generating a magnetic field $H_G$ at the gap to alter the magnetization directions in regions of LL, ML and UL, the magnetization directions of LL, ML and UL in said regions being parallel, the write head being maintained near the medium whereby the field at the middle of LL is greater than $H_{OLL}$, the field at the middle of ML is greater than $H_{OML}$, and the field at the middle of UL is greater than $H_{OUL}$.

2. The system of claim 1 wherein each of the nonferromagnetic spacer layers is less than approximately 1.5 nm thick.

3. The system of claim 1 wherein $H_{OML}$ is at least 15 percent less than $H_{OUL}$.

4. The system of claim 1 wherein $H_{OUL}$ is at least 70 percent of $H_G$.

5. The system of claim 1 wherein each of LL, ML and UL comprises a CoPtCrB alloy.

6. The system of claim 5 wherein the amount of Pt in UL is greater than the amount of Pt in ML and the amount of Pt in ML is greater than the amount of Pt in LL.

7. The system of claim 5 wherein the amount of B in LL is less than the amount of B in each of ML and UL.

8. The system of claim 5 wherein the amount of Cr in LL is greater than the amount of Cr in each of ML and UL.

9. The system of claim 1 wherein LL is the top ferromagnetic layer of an antiferromagnetically coupled (AFC) layer, the AFC layer comprising a bottom ferromagnetic layer, said top ferromagnetic layer and an antiferromagnetically-coupling film located between said bottom and top ferromagnetic layers and having a thickness and composition to provide antiferromagnetic exchange coupling of said bottom and top ferromagnetic layers.

10. The system of claim 9 wherein the antiferromagnetically coupling film of the AFC layer is formed of a material selected from the group consisting of ruthenium (Ru), chromium (Cr), rhodium (Rh), iridium (Ir), copper (Cu), and their alloys.

11. The system of claim 1 wherein the medium is a magnetic recording disk having a substrate; LL, ML and UL are on the substrate; and the system is a magnetic recording disk drive.

12. The system of claim 11 further comprising an underlayer located on the substrate between the substrate and LL.

13. The system of claim 11 further comprising a protective overcoat formed over UL.

14. The system of claim 11 further comprising a slider for supporting the write head.

15. A magnetic recording disk drive comprising:
   a magnetic recording disk comprising:
      a substrate;
      an antiferromagnetically coupled (AFC) layer on the substrate comprising a bottom ferromagnetic film, a top ferromagnetic film and an antiferromagnetically-coupling film located between said bottom and top ferromagnetic films providing antiferromagnetic exchange coupling of said bottom and top ferromagnetic films, the top ferromagnetic film of the AFC layer being the lower ferromagnetic layer (LL) on the substrate and having an intrinsic coercivity $H_{OLL}$;
      a first nonferromagnetic spacer layer on LL;
      a middle ferromagnetic layer (ML) on the first nonferromagnetic spacer layer and having an intrinsic coercivity $H_{OML}$ greater than $H_{OLL}$;
      a second nonferromagnetic spacer layer on ML; and
      an upper ferromagnetic layer (UL) on the second nonferromagnetic spacer layer and having an intrinsic coercivity $H_{OUL}$ greater than $H_{OML}$;
   an air-bearing slider maintained near the surface of the disk; and
   an inductive write head on the trailing end of the slider and having write poles separated by a write gap, the write head being capable of generating a magnetic field $H_G$ at the gap to alter the magnetization directions in regions of LL, ML and UL, the magnetization directions of LL, ML and UL in said regions being parallel, whereby the field at the middle of LL is greater than $H_{OLL}$, the field at the middle of ML is greater than $H_{OML}$, and the field at the middle of UL is greater than $H_{OUL}$.

16. The disk drive of claim 15 wherein each of the nonferromagnetic spacer layers is less than approximately 1.5 nm thick.

17. The disk drive of claim 15 wherein $H_{OLL}$ is at least 25 percent less than $H_{OUL}$.

18. The disk drive of claim 15 wherein $H_{OML}$ is at least 15 percent less than $H_{OUL}$.

19. The disk drive of claim 15 wherein $H_{OUL}$ is at least 70 percent of $H_G$.

20. The disk drive of claim 15 wherein each of LL, ML and UL comprises a CoPtCrB alloy.

21. The disk drive of claim 20 wherein the amount of Pt in UL is greater than the amount of Pt in ML and the amount of Pt in ML is greater than the amount of Pt in LL.

22. The disk drive of claim 20 wherein the amount of B in LL is less than the amount of B in each of ML and UL.

23. The disk drive of claim 20 wherein the amount of Cr in LL is greater than the amount of Cr in each of ML and UL.

24. The disk drive of claim 15 wherein the antiferromagnetically-coupling film of the AFC layer is formed of a material selected from the group consisting of ruthenium (Ru), chromium (Cr), rhodium (Rh), iridium (Ir), copper (Cu), and their alloys.

25. The disk drive of claim 15 further comprising an underlayer located on the substrate between the substrate and the bottom ferromagnetic film of the AFC layer.

26. The disk drive of claim 15 further comprising a protective overcoat formed over UL.

* * * * *